US008587662B1

(12) United States Patent
Moll et al.

(10) Patent No.: US 8,587,662 B1
(45) Date of Patent: Nov. 19, 2013

(54) THEFT TREND ANALYSIS AND RESPONSE

(75) Inventors: Derek Moll, Minneapolis, MN (US); Robert Foster, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 632 days.

(21) Appl. No.: 12/572,825

(22) Filed: Oct. 2, 2009

Related U.S. Application Data

(60) Provisional application No. 61/111,894, filed on Nov. 6, 2008.

(51) Int. Cl.
*H04N 7/18* (2006.01)

(52) U.S. Cl.
USPC ............................. 348/159; 348/143; 348/144

(58) Field of Classification Search
USPC .......................... 348/159, 143, 144, 152, 153
See application file for complete search history.

(56) References Cited

U.S. PATENT DOCUMENTS

| 6,778,085 | B2 | 8/2004 | Faulkner et al. | |
|---|---|---|---|---|
| 2005/0010808 | A1* | 1/2005 | Wixson et al. | 713/200 |
| 2007/0282665 | A1* | 12/2007 | Buehler et al. | 705/10 |

OTHER PUBLICATIONS

City of Orland. "Orlando City News: Mar. 28, 2008." Retrieved from the Internet: <URL: http://www.cityoforlando.net/thecitybeautiful/email/20080328.html>.
D'Amico, Joseph. "Stopping Crime in Real Time." *The Police Chief: The Professional Voice of Law Enforcement*. Sep. 2006. Retrieved from the Internet: <URL: http://policechiefmagazine.org/magazine/index.cfm?fuseaction=display_arch&article_id=995&issue_id=92006>.
Fields, Marc and Steve Castor. "Case Study: Erlanger Kentucky Police Department Captures Critical Data to Fight Crime." *Information Management*. Aug. 26, 2008. Retrieved from the Internet: <URL: http:// http://www.information-management.com/specialreports/2008_94/10001847-1.html?type=printer_friendly>.
National Check Fraud Center. "National Check Fraud Center: Your Complete Source for Assistance—Information—Alert Reports regarding Counterfeit Checks—Forgery—Check Fraud—Bank Fraud—White Collar Crimes." Retrieved from the Internet: <URL: National Crime Alert Network. "National Crime Alert Network: A Division of the National Check Fraud Center." Retrieved from the Internet: <URL: http://www.ckfraud.org >.
National Crime Alert Network. "National Crime Alert Network: A Division of the National Check Fraud Center." Retrieved from the Internet: <URL: http://www.ckfraud.org/network.html>.
Omnicast. "Genetic: I Choose Reliability." Genetec Inv. 1997-2006. Retrieved from the Internet: <URL: http://web.archive.org/web/20080114023743/http://www.genetec.com/english/solutions/omnicast/overview.aspx>.

* cited by examiner

*Primary Examiner* — Barbara Burgess
(74) *Attorney, Agent, or Firm* — Merek, Blacklon & Voorhees, LLC

(57) ABSTRACT

A method for responding to potential threats at a store, such as theft or vandalism, can include analyzing threat predictors, such as police reports and store reports, to determine a trend of theft or other threats. In some implementations, a organization, such as a chain of retail stores, can include a large number of facilities. Each facility may be capable of producing a significant volume of video data from various video cameras at the facility. In some implementations, the volume of video data monitored from the stores and from the cameras within the stores can be narrowed or reduced by monitoring substantially only the video data from the stores and locations within the stores that were identified as potential targets in the trend of theft.

20 Claims, 6 Drawing Sheets

THEFT TREND ANALYSIS AND RESPONSE

CLAIM OF PRIORITY

This application claims priority to U.S. Provisional Patent Application Ser. No. 61/111,894, filed on Nov. 6, 2008, and entitled "Theft Trend Analysis and Response Method."

BACKGROUND

Theft at retail stores is a continuing problem. In some cases, stores use video monitoring in an attempt to prevent theft. Typically, there is a large amount of video from multiple cameras at multiple locations. Some stores may generate hundreds of hours, or more, of video every day. Personnel at a store may monitor the video from the cameras in real-time in an attempt to detect and prevent theft. In some cases, a theft may be recorded by a camera and never seen by store personnel. In another example, a theft can occur, and be discovered at a later time, such as by comparing stock levels with sales. When thefts occur but are not discovered until some time later, the response to such thefts is a reactive response. In some cases, a reactive response can lead to apprehension of a thief, for example, where an investigation of video leads to an identification of an actual individual in sufficient detail to allow that individual to be apprehended at a later time.

In some cases, video monitoring and video analytics can be used in a retail store environment. Video monitoring can be used for a number of purposes, such as security monitoring, store personnel compliance monitoring, and monitoring for various problems or issues that can be corrected or addressed (for example, spills, wet floors, or long lines at checkout lanes). Thefts or other suspicious activity can on occasion be caught by random real-time monitoring of video. In some cases, the video can be reviewed after the fact, for example, when it is known that a theft has occurred. In that situation, security or other store personnel, or even investigators, can go through specifically chosen video for a camera known to have been directed at the area where the theft took place.

SUMMARY

A method for responding to potential threats at a store, such as theft or vandalism, can include analyzing threat predictors, such as police reports and store reports, to determine a trend of theft or other threats. In some implementations, a organization, such as a chain of retail stores, can include a large number of facilities. Each facility may be capable of producing a significant volume of video data from various video cameras at the facility. In some implementations, the volume of video data monitored from the stores and from the cameras within the stores can be narrowed or reduced by monitoring substantially only the video data from the stores and locations within the stores that were identified as potential targets in the trend of theft.

In some implementations, the stores in the area of the potential threat as identified by the trend are notified of the possible threat. Video data from those stores can then be monitored to identify one or more persons of interest identified in the trend of theft. For example, the persons of interest may be individuals who have previously been involved in a theft or other threat within the area of the stores. In some implementations, when a person of interest is identified at a particular store, the store is then notified of the specific person or threat present at the store. Further, in some implementations, personnel at the store are given directions to the location of the person of interest in real-time using the real-time video data from the store.

The systems and techniques described here may provide one or more of the following advantages. First, a system can provide a directed approach to predicting potential thefts that narrows the focus of investigations, such as video monitoring, to a manageable size. Second, a system can provide for narrowing the focus of the investigations to increase the likelihood of preventing thefts. Third, a system can provide for use of fewer personnel than in a typical response to theft prevention. Fourth, a system can provide for use of fewer personnel than in a typical response to theft prevention and still maintain an equal or greater rate of theft prevention and/or apprehension of thieves. Fifth, a system can provide for proactive prediction of potential threats and thefts resulting in a greater chance of theft prevention than a reactive approach, such as security tags and alarms. Sixth, a system can provide for a small group of in-store personnel directed by a central theft investigation system that provide a greater level of theft prevention and apprehension than a large conspicuous group of undirected in-store personnel.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION OF ILLUSTRATIVE IMPLEMENTATIONS

This document describes systems and techniques for identifying potential thefts, and to proactively respond to the potential thefts. The potential thefts are identified using trend analysis. Geographic areas of the potential thefts are determined based on the trend analysis. Real-time video monitoring is used at a store to identify one or more persons of interest involved in a potential theft. Nearly instant communication is used between the video monitoring system and mobile communications device carried by in-store personnel to avert the potential theft.

A person who steals from a store often follows a pattern that can be identified by analysis of theft reports, store reports, identified thefts, police reports, and other information related to thefts. For example, trends can show that a particular type of item, such as electronics, are being stolen in a pattern. Patterns can include a time of day, a day of the week, a geographic location, a type of item being stolen, etc.

Identified trends or patterns of behavior of thieves or other persons of interest can be combined with physical details of not only the thefts, but also of identified thieves. Such physical details can be obtained, for example, from theft reports, store reports, identified thefts, and by other information, including, for example, witness reports and video details of past thefts. The physical details of thieves and the patterns involved in their crimes may allow identification of actual individuals involved in theft rings or identify items related to the thieves. For example, the physical details may indicate a vehicle license plate number, a type of vehicle, or a color of a vehicle.

In combination with trends, the physical details may allow identification of potential future targets of theft. For example, the trend may include stores along a highway and potential future targets may include other stores along the highway. In another example, the trend may include stores within an isolated geographic region, such as an area bounded by a body of water, a busy road, or other natural or man-made boundary, and the potential future targets may include other stores within the bounded region. In another example, the trend may include stores within some distance of one another, such as stores within a ten mile radius of a central location, and the other stores within the ten mile radius of the central location may be potential targets of theft. In still further examples, a theft trend is driven at least in part by theft demand centers like pawn shops and video game buyback shops, which serve as physical contributors to theft activity.

In some implementations, changes in the trend of theft over time can be analyzed to determine future potential targets of theft. For example, in the radius of theft previously described, the over time the radius may be seen to expand. Stores in a ring outside the radius may be notified ahead of the thefts actually expanding to the outside ring.

Figure 1:
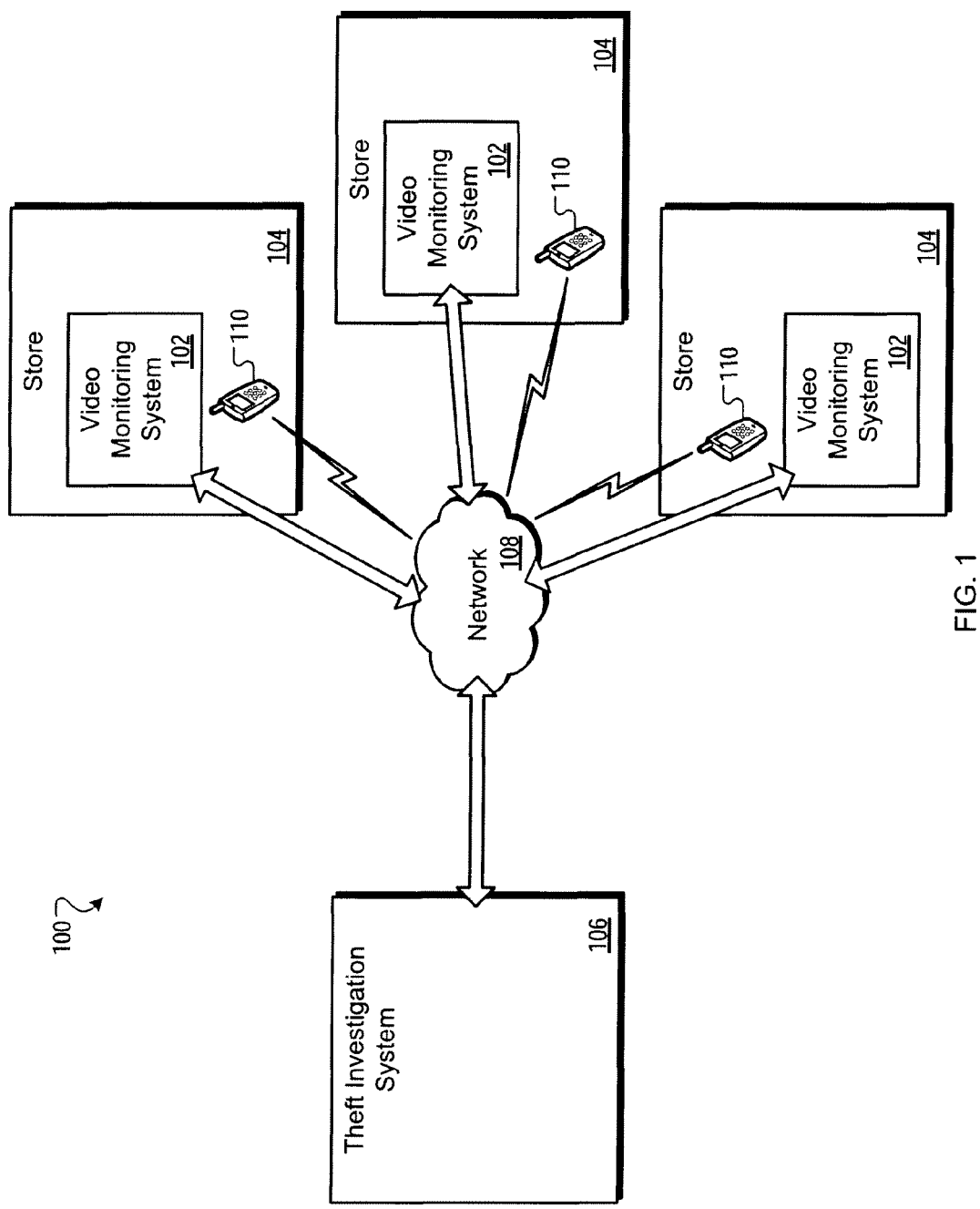
FIG. 1 is a schematic diagram showing an example of a system for theft trend analysis and response.

FIG. 1 is a schematic diagram showing an example of a system 100 for theft trend analysis and response. The system 100 includes multiple video monitoring systems 102 each within one of multiple stores 104. Each of the video monitoring systems 102 communicates with a theft investigation system 106 over a network 108. For example, the network 108 may include a computer network, such as a wide area network or the Internet. In another example, the network 108 may include another type of network, such as a telephone network. In some implementations, the theft investigation system 106 is capable of monitoring video data from one or more of the video monitoring systems 102 in real-time. In some implementations, one or more of the video monitoring systems 102 perform the monitoring of video data in real-time.

The stores 104 further include one or more real-time communication devices 110. The real-time communication devices 110 provide for real-time or nearly instant communication between the theft investigation system 106 and the stores 104. In some implementations, the real-time communication devices 110 are mobile telephone devices that provide real-time or nearly instant communication. For example, the mobile devices can be push-to-talk mobile telephones.

In some implementations, the phrase "nearly instant" refers to a short amount of time that elapses between identifying the persons of interest and notifying the corresponding in-store personnel. For example, nearly instant may be less than one second (e.g., less than one hundred, two hundred, three hundred, four hundred, five hundred, six hundred, seven hundred, eight hundred, or nine hundred milliseconds) from the time the persons or interest are identified to the time the personnel are notified. In another example, nearly instant may be a few seconds (e.g., less than one, two, three, four, five, six, seven, eight, or nine seconds). In another example, nearly instant may be a few minutes (e.g., less than one, two, three, four, five, six, seven, eight, or nine minutes). In some implementations, the nearly instant interval of time begins at a time that an attempted theft is identified by the video monitoring.

The theft investigation system 106 determines trends of theft using available information from multiple sources. For example, sources can include known thefts within stores and within geographic areas, police reports, industry reports, and media reports. The theft information can include one or more of a theft time, theft location, items that were stolen, descriptions of the person or persons who made the theft, descriptions of the vehicle or vehicles used during or after the theft, and a method or methods of theft. Upon analysis of the known details of the thefts, a pattern or trend can be identified. For example, a group of thieves either working together or independently may be identified as stealing a particular type of item or striking at a particular time-of-day and/or day of the week.

In some implementations, if a trend is identified, the theft investigation system 106 can make a prediction as to a likely location or locations for continued thefts along similar patterns. For example, if a group of thieves known to be using vans has stolen vacuum cleaners from a number of retail stores all in one area, such as along a freeway corridor, occurring between 7:00 pm and 10:00 pm, and progressing in a particular direction, then a pattern of thefts may be determined to be continuing along the freeway corridor. A group of stores may be identified as being within the projected area for potential future thefts. The prediction can be made in a number of ways, for example, by human analysis of identified trend information and physical detail information about crimes and/or persons of interest in crimes, or by computer analysis of trends such as through trend-tracking software. In another example, restocking patterns may be used to predict recurring theft. Inventory is depleted by theft and predetermined patterns of restocking associated with theft activity is used to predict thieves' return to the location. Such software may be used to determine patterns from data input into the program or gathered from various sources. Such software can then indicate trends, such as a geographic location in which a series of crimes has occurred.

Some retailers have many stores spread out over large areas. The stores of some retailers are assigned to different geographic area groups, such as stores in a particular city, stores in a particular part of a city, or stores along a particular stretch of road. In some implementations, stores are grouped into clusters of about five stores. Identified trends can show patterns that indicate where potential thefts may occur, for example at a particular cluster of stores, or at several clusters of stores that are near one another geographically. When a trend is identified, the theft investigation system 106 notifies a cluster of stores indicated by the trend to be a potential theft target with a general notification indicating details of the identified trend, such as a make, model and color of vehicles used, identities or physical characteristics of potential persons involved in thefts, a time of day a theft is likely to occur, and an area or department within the store or particular item or items that are likely targets of the theft.

In some implementations, the trend analysis includes stores within a retail store group monitoring stock and inventory on a daily or even more than daily basis, particularly for items or products previously identified as high-theft items. Individual stores may review stock and inventory, as well as store video from an in-store video monitoring system, to determine whether an identifiable individual or group of individuals is responsible for identified thefts.

Findings and/or determinations made by the stores 104 are reported to the theft investigation system 106. For example, the theft investigation system 106 may be an asset protection group. At the theft investigation system 106, reports from the stores 104 are analyzed for patterns, such as geographic proximity between multiple thefts, thefts of the same or similar items at multiple stores, timing of thefts, identified individuals or groups of individuals making thefts at more than one store, and identification of vehicles used in thefts or to deliver or pick up individuals or groups of individuals to stores where thefts occur.

In some implementations, a group of stores, associated with a retailer, that is along a projected path or within a predicted geographic area of new thefts is alerted generally that a potential theft might be occurring in a particular area of the store within a range of times on a particular date or within a range of dates. At the same time, a broadcast notification of an even more general nature can be sent to a larger market, such as a whole market or larger geographic area.

For those stores within a specifically identified area or along a specifically identified path, such as a cluster or several clusters of stores, the theft investigation system 106 notifies an employee or employees of each store identified as potential targets for the theft to be ready and available. In some implementations, one or more of the employees being notified include specialized theft or crime investigators. Once a notification is made to a specific cluster or to several clusters of stores, real-time monitoring of the stores is performed. The real-time monitoring may be performed remotely by the theft investigation system 106 or by the video monitoring systems 102 within the stores 104.

The process of real-time monitoring analyzes the video data for the arrival or identification of one or more persons of interest in the potential theft. In some implementations, real-time monitoring includes a remote monitoring facility having personnel to monitor each of the stores in the identified cluster or several clusters of stores for arrival of a person or persons of interest, or for identifying a person or persons of interest within one of the cluster of stores. Such identification or arrival may be determined by monitoring a video surveillance system in place at each of the stores, such as by a remote monitoring station with access to video monitoring from multiple stores. As discussed above, in selected embodiments real-time communication from the monitoring system to store personnel is utilized to avert potential theft.

For example, a first communication of potential thefts may target an entire market or broad area, indicating that a high number of thefts have occurred within a large market area containing many stores. A general alert can be issued in one or more ways, including email, text messaging, and general alerts through store channels. Each large market, large area, or large group of stores can be divided into smaller units of stores, for example, clusters of five stores that are in a submarket or sub-area. The clusters can be more closely spaced stores than those stores in the entire large market or large area.

Once an identification is made of a person or persons of interest at a particular store that is being monitored, the remaining stores in the cluster or several clusters can be notified to maintain one or more employee or investigators at a ready and available status. For example, they can be notified to "stand down" or relax their ready and available status. Also, if a theft occurs within the particular store that is being monitored, and the person or persons of interest are not apprehended, then other stores within the cluster of stores can be notified immediately that the potential threat remains, and the store personnel can stay on alert. Monitoring and communication between the central location and the stores in the cluster of stores can continue.

In some implementations, personnel at the remote monitoring location direct the employee and/or investigator at the particular store to the location in the store where a theft or other threat is actually occurring. The personnel or systems at the remote monitoring location can use a combination of real-time monitoring of the actions of the person or persons of interest, as well as real-time communication with the employee and/or investigator. For example, the remote monitoring location can use "push-to-talk" telephones, walkie-talkies, or other real-time wireless communication devices to communicate with the in-store employees and investigators.

When a person or persons of interest are identified at the particular store within the stores in a local area, an attempt may be made to apprehend the person or persons of interest. The theft investigation system 106 can monitor video from the store to direct the in-store personnel to the persons of interest in real-time. The use of an instant form of communication allows notification of in-store personnel in real-time when a person or persons of interest are identified by the theft investigation system 106. Further, if the person or persons of interest are not apprehended at the particular store within the stores in the local area, the process may be repeated with the other stores in the local area.

Figure 2:
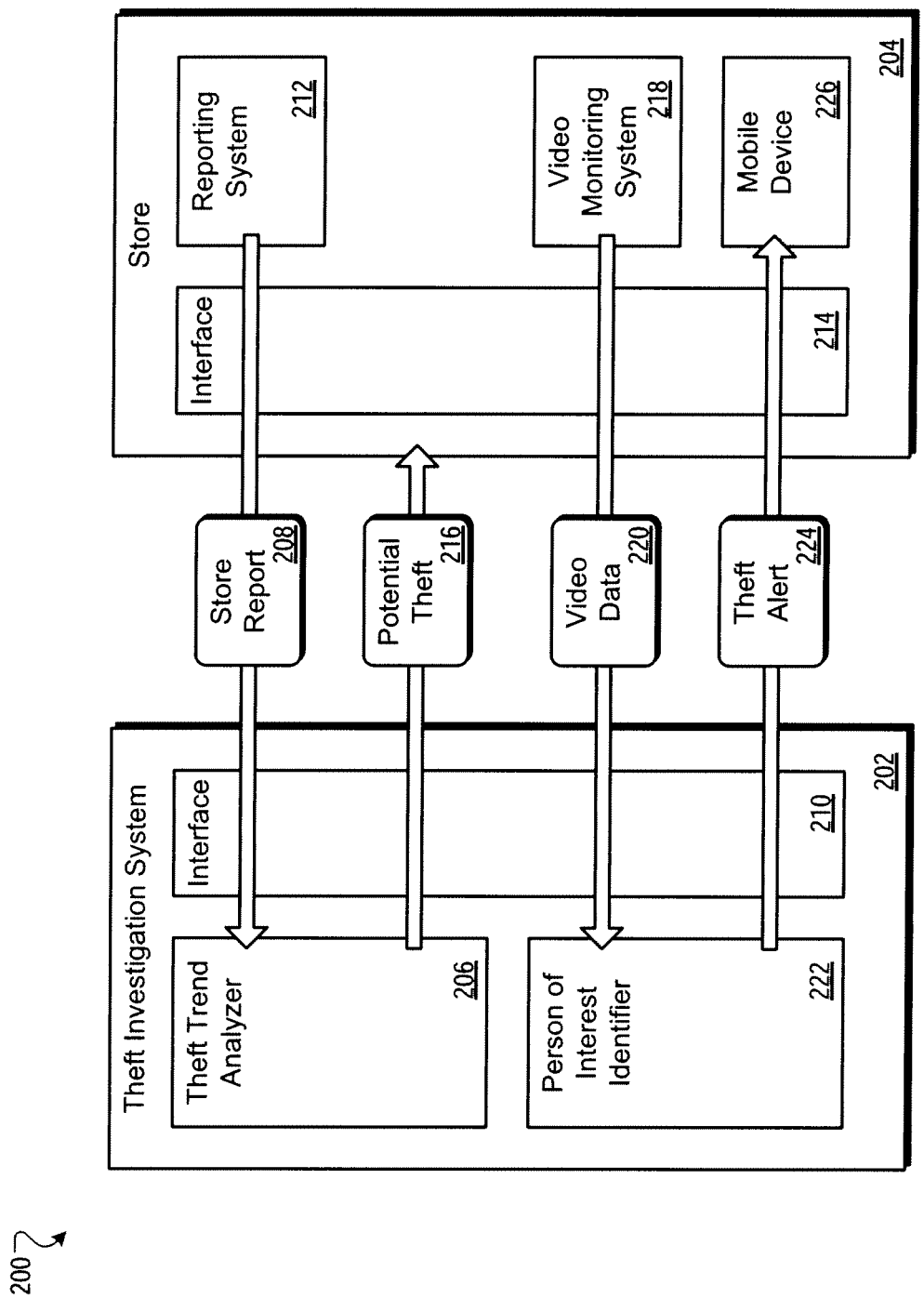
FIG. 2 is a block diagram showing an example of a system for theft trend analysis and response.

FIG. 2 is a block diagram showing an example of a system 200 for theft trend analysis and response. The system 200 includes a theft investigation system 202 and a store 204. In some implementations, the system 200 includes multiple stores. The theft investigation system 202 includes a theft trend analyzer 206. The theft trend analyzer 206 receives theft reports, store reports, and other theft related information. For example, the theft trend analyzer 206 can receive a store report 208 from the store 204 through an interface 210. The store 204 includes a reporting system 212. The reporting system 212 outputs the store report 208 to the theft trend analyzer 206 through an interface 214.

The theft trend analyzer 206 uses information in the store report 208, and the information from other sources and stores, to identify trends in theft. For example, the theft trend analyzer 206 can indentify a geographic area in which stores have been targets of theft. In another example, the theft trend analyzer 206 can identify one or more persons involved in the thefts. In another example, the theft trend analyzer 206 can identify particular items, departments, or areas within the stores as targets of theft. Garden centers or locations with multiple entries sometimes constitute attractive targets for theft and therefore may produce an observable theft trend.

The theft trend analyzer 206 outputs a potential theft notification 216 to the stores, including the store 204. In some implementations, the theft trend analyzer 206 only outputs the potential theft notification 216 to stores identified as being potential targets of theft. In some implementations, the theft trend analyzer 206 identifies stores as being potential targets of theft based on the trend of theft.

The potential theft notification 216 can be, for example, an email notification or a telephone notification. The potential theft notification 216 can include information related to the potential theft, such as pictures or descriptions of the one or more persons of interest. The potential theft notification 216 can include pictures or descriptions of a vehicle used by the persons of interest. The potential theft notification 216 can identify possible targets of the potential theft, such as an electronics department within the stores, a type of items (e.g., televisions), or a specific brand or model of a product.

The store 204 includes a video monitoring system 218. The video monitoring system 218 can record video in various locations in and around the store 204. Upon receiving the potential theft notification 216, the video monitoring system 218 records video from the locations in and around the store 204 that were identified in the potential theft notification 216 and sends the recorded video to the theft investigation system 202, as video data 220.

The theft investigation system 202 includes a person of interest identifier 222. The person of interest identifier 222 receives the video data 220 from the store 204 and other video data from the other stores in the trend of theft. In some implementations, the person of interest identifier 222 substantially only receives video data from stores, and/or locations within those stores, that were identified in the trend of theft as being potential targets of future theft.

The person of interest identifier 222 performs a recognition process on the video data 220 and the other video data to determine if a person of interest or an item associated with a person of interest is present at a store. For example, the person of interest identifier 222 can identify one or more faces, clothing, a license plate number, or a vehicle make or model. The person of interest identifier 222 compares the recognized objects (e.g., faces, clothing, license numbers, cars) to the information in the trend of theft to determine if one or more of the recognized objects match the information in the trend of theft. If for example the person of interest identifier 222 identifies a match in the video data 220, then the person of interest identifier 222 sends a theft alert 224 to a mobile device 226 at the store 204.

The theft alert 224 can include a description, one or more images, or video of the person of interest or a vehicle associated with the person of interest. In some implementations, the images and video of the person of interest can be sent to the mobile device 226 in real-time or nearly real-time, such that the personnel at the store 204 operating the mobile device 226 can compare or match the images and/or video on the mobile device 226 with the personnel's surroundings at the store 204.

In some implementations, the mobile device 226 provides position information to the theft investigation system 202. The position information can include, for example, global positioning system (GPS) data or positioning information from an in-store positioning system. In some implementations, the person of interest identifier 222 can determine the position of the mobile device 226 and/or the person of interest using the video data 220. The position information allows the person of interest identifier 222 to provide the mobile device 226 with directions from the location of the mobile device 226 to the location of the person of interest.

In some implementations, the theft alert 224 can be an on-going communication between the theft investigation system 202 and the mobile device 226. For example, the person of interest identifier 222 can continue to receive video data from the store 204. The person of interest identifier 222 can provide directions from the current position of the mobile device 226 to the current position of the person of interest. The person of interest identifier 222 can update the directions in real-time as the positions of the mobile device 226 and the person of interest change.

Figure 3:
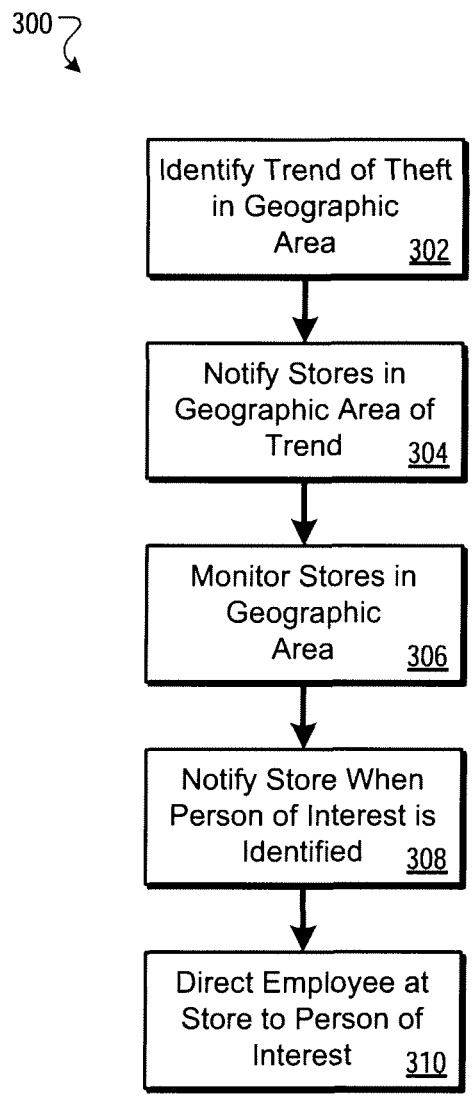
FIG. 3 is a flow chart showing an example of a process for theft trend analysis and response.
Figure 4:
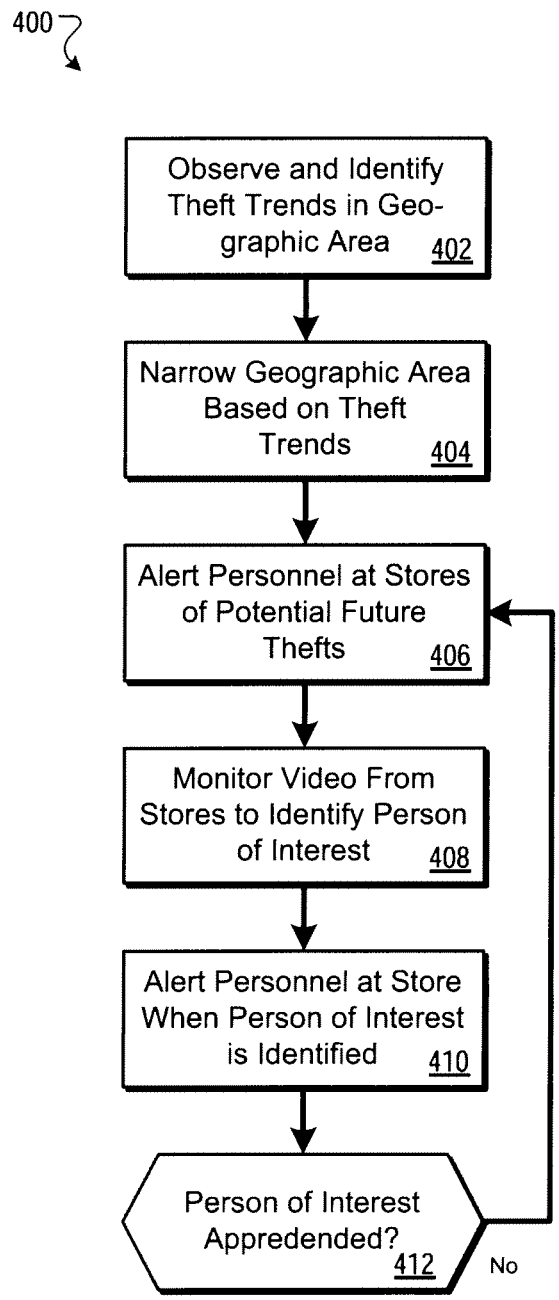
FIG. 4 is a flow chart showing an example of a process for theft trend analysis and response.
Figure 5:
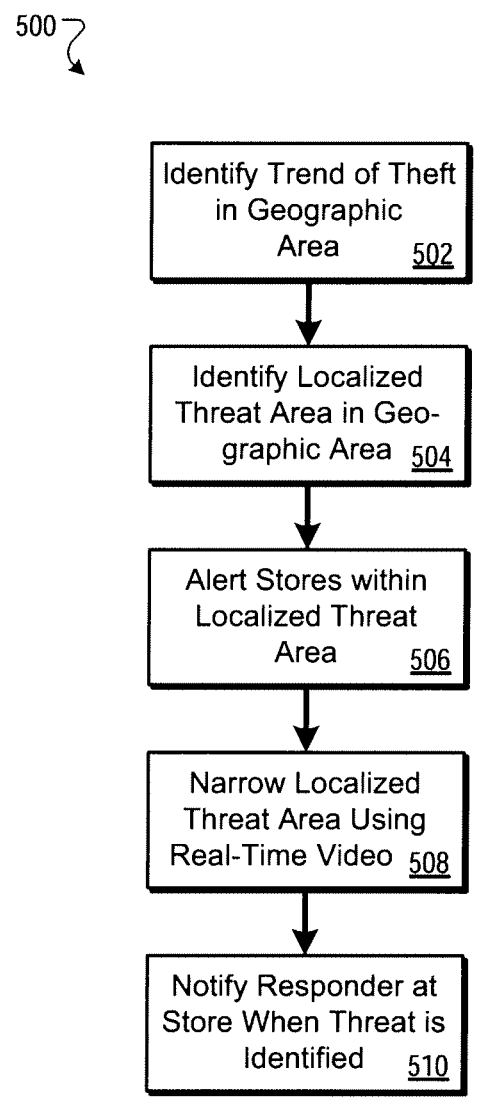
FIG. 5 is a flow chart showing an example of a process for theft trend analysis and response.

FIGS. 3, 4, and 5 are flow charts showing examples of processes for theft detection and/or response. The processes can be performed, for example, by a system such as the systems 100 and 200. For clarity of presentation, the description that follows uses the systems 100 and 200 as the basis of an example for describing the processes. However, another system, or combination of systems, may be used to perform the processes.

FIG. 3 is a flow chart showing an example of a process 300 for theft detection and response. The process 300 begins with identifying (302) a trend of theft in a first geographic area. For example, the theft trend analyzer 206 can analyze store reports, including the store report 208, to identify a trend in theft, such as thefts occurring at stores along an interstate highway road. In some implementations, identifying the trend includes identifying the persons of interest from video obtained at prior thefts, police reports, theft reports, and/or witness reports. In some implementations, identifying the trend includes analyzing theft reports from the first geographic area, police reports from the first geographic area, and/or store reports from the first stores.

The process 300 notifies (304) a first set of stores within the first geographic area of the trend. For example, the theft trend analyzer 206 sends the potential theft notification 216 to stores, including the store 204, that may be targets of theft based on the determined trend of theft.

The process 300 monitors (306) substantially only the first stores within the first geographic area that were identified in the trend of theft. The process 300 monitors the first stores in real-time. For example, the person of interest identifier 222 receives video from the stores, including the video data 220 from the store 204. The person of interest identifier 222 performs image recognition to identify one or persons of interest in the video data 220 or items associated with a person of interest, such as a vehicle. In some implementations, monitoring the first stores includes monitoring for the persons of interest in the trend of theft. In some implementations, monitoring the first stores includes monitoring at a time-of-day and/or a particular product location within the first stores. For example, the video monitoring system 218 can record video a particular time-of-day and from a particular location within the store 204 based on times, products, and/or locations specified in the potential theft notification 216.

The process 300 notifies (308) a store among the first stores when the monitoring of the first stores identifies one or more persons of interest in the trend of theft as being present at the store. For example, the person of interest identifier 222 sends the theft alert 224 to the mobile device 226.

The process 300 communicates (310) directly with at least one employee of the store to direct the employee to the persons of interest. For example, the person of interest identifier 222 can provide directions to the store personnel operating the mobile device 226 to the position of the person of interest. The directions can include turn-by-turn type directions. The directions can include a map of the store, for example, with a "you are here" map marker and a "person of interest is here" map marker. The directions can include a real-time picture of the person showing a portion of the store that is near the person of interest. In some implementations, the initial theft alert and/or the on-going directions to the person of interest can be silent or provided through an ear piece so as not to alert the person of interest.

In some implementations, when a theft occurs at the store and the persons of interest are not apprehended, the process 300 notifies a remainder of the first stores that the persons of interest may be moving to one of the remainder of the first stores. In some implementations, when a theft occurs at the store and the persons of interest are not apprehended, the process 300 notifies a second set of stores within a second geographic area near the first geographic area.

FIG. 4 is a flow chart showing an example of a process 400 for theft detection. The process 400 begins with observing (402) and identifying trends of theft in a first geographic area. For example, the store 204 can provide theft information from a geographic area of the store 204 to the theft investigation system 202 in the store report 208. The theft trend analyzer 206 receives the store report 208, theft reports from other stores also within in the geographic area, police reports related to the geographic area, and other theft information related to the geographic area of the stores. The theft trend analyzer 206 identifies a trend of theft in the received theft information.

The process 400 narrows (404) the first geographic area to a second geographic area that is smaller than the first geographic area and that includes one or more stores likely to be targets of potential future thefts based on the observed and identified trends of theft. For example, based on the identified trend of theft, the theft trend analyzer 206 can narrow the geographic area of the stores to a smaller geographic area that includes only those stores within the geographic area that are within a region bounded by a particular body of water and a busy divided road.

The process 400 alerts (406) personnel at the stores of the potential future thefts. For example, where the store 204 lies within the region bounded by the body of water and the divided road, the theft trend analyzer 206 sends the store 204, and the other stores in the bounded region, the potential theft notification 216.

The process 400 monitors (408) video from substantially only the stores in the second geographic area. The process 400 monitors the stores in real-time at a time-of-day likely to include the potential future thefts to identify one or more persons of interest. For example, the person of interest identifier 222 receives the video data 220 from the store 204 and video data from other stores in the region. The person of interest identifier 222 analyzes portions of the video data from the time-of-day identified in the trend of theft as being likely to include a theft. The analysis includes performing image recognition to identify one or more persons of interest or items associated with a person of interest, such as a car or clothing. The analysis and image recognition can use images or descriptions of the persons of interest and the items associated with the persons of interest from the theft information and the identified trend of theft.

The process 400 alerts (410) personnel at a store among the stores when the persons of interest are identified at the store. For example, the person of interest identifier 222 sends the theft alert 224 to the store 204 when the person of interest identifier 222 determines that the person of interest is currently at the store 204. In some implementations, the process 400 directs the personnel at the store in real-time to the persons of interest using a push-to-talk telephone. If the persons of interest are not apprehended (412), then the process 400 alerts (406) personnel at the stores again.

FIG. 5 is a flow chart showing an example of a process 500 for theft response. The process 500 begins with identifying (502) a trend of theft within a first geographic area. For example, the theft trend analyzer 206 receives the store reports 208 from the store 204, additional store reports from other stores in the geographic area of the store 204, police reports for the geographic area, and other theft information related to the geographic area. The theft trend analyzer 206 uses the theft information to identify or determine a trend of theft.

The process 500 identifies (504) a localized threat area within the first geographic area. For example, the theft trend analyzer 206 can identify a region within the geographic area, such as a region along an interstate highway road, a region bounded by natural or man-made geographic features, and/or a region within some radius of a particular location within the geographic area.

The process 500 alerts (506) one or more stores within the localized threat area of potential thefts. For example, the theft trend analyzer 206 sends the potential theft notification 216 to the store 204 and the other stores in the localized area.

The process 500 narrows (508) the localized threat area based on real-time video monitoring observation. In some implementations, narrowing the localized threat area includes identifying a known thief at a store among the stores. For example, the person of interest identifier 222 receives the video data 220 from the store 204 and additional video data from the other stores in the localized area. The person of interest identifier 222 analyzes the video data to identify a person or persons of interest. In some implementations, the person of interest identifier 222 searches for persons of interest that had been included in the store reports, police reports, and/or the trend of theft. Once the person of interest identifier 222 identifies a person of interest in video data, such as the video data 220, the person of interest identifier 222 narrows the localized threat area to the store 204 from which the video data 220 including the person of interest was received.

The process 500 notifies (510) a responder at a store among the stores when a known threat is identified at the store. In some implementations, notifying the responder includes notifying the responder using a push-to-talk telephone. For example, the person of interest identifier 222 can send the theft alert 224 to the mobile device 226 at the store 204.

In some implementations, the systems and techniques described in this document may be implemented using a computer or computer system of networked computers, or may be implemented in software or firmware within the computer or computer system. For example, computer-readable instructions can be stored on computer-usable media, and may be in the form of software, firmware, or hardware. The computer-readable instructions configure the computer or computer system to execute the methods described herein.

In a hardware solution, the computer-readable instructions can be hard coded as part of a processor, e.g., an application-specific integrated circuit (ASIC) chip. In a software or firmware solution, the instructions are stored for retrieval by a processor in the computer or as part of the computer system. Some additional examples of computer-usable media include static or dynamic random access memory (SRAM or DRAM), read-only memory (ROM), electrically-erasable programmable ROM (EEPROM or flash memory), magnetic media and optical media, whether permanent or removable. Most consumer-oriented computer applications are software solutions provided to the user on some form of removable computer-usable media, such as a compact disc read-only memory (CD-ROM) or digital video disc (DVD). In some implementations, the computer may include a storage device, such as a hard drive, removable flash memory, etc., for storing the computer-readable instructions for operation by the processor.

The computer-readable instructions can cause the computer on which the instructions are loaded to perform a method that includes at least one of trend analysis; monitoring a connected or coupled video monitoring system; mining trend data from databases containing detailed theft information and trend precursors. For example, theft information and trend precursors can include video of known thefts, theft reports, police reports, store reports, eye-witness reports, theft locations, theft frequencies, theft times, and items stolen during thefts.

When a person or persons of interest are identified, and a theft trend is determined, video or still images of the person or persons of interest can be loaded into the computer system so that video monitoring systems at a plurality of stores in a geographic are of potential future thefts can be used to identify when the person or persons of interest in the trend or the potential trend in theft arrive at or are within one of the plurality of stores. When the person or persons of interest are identified, using such identification methods as facial recognition, the computer system, through the computer-readable instructions, contacts the store at which the identified person or persons of interest have arrived or have been located, indicating a potential theft target based on past thefts, identified trends, and the location within the store of the identified person or persons of interest, and directing store personnel to the person or persons of interest.

Figure 6:
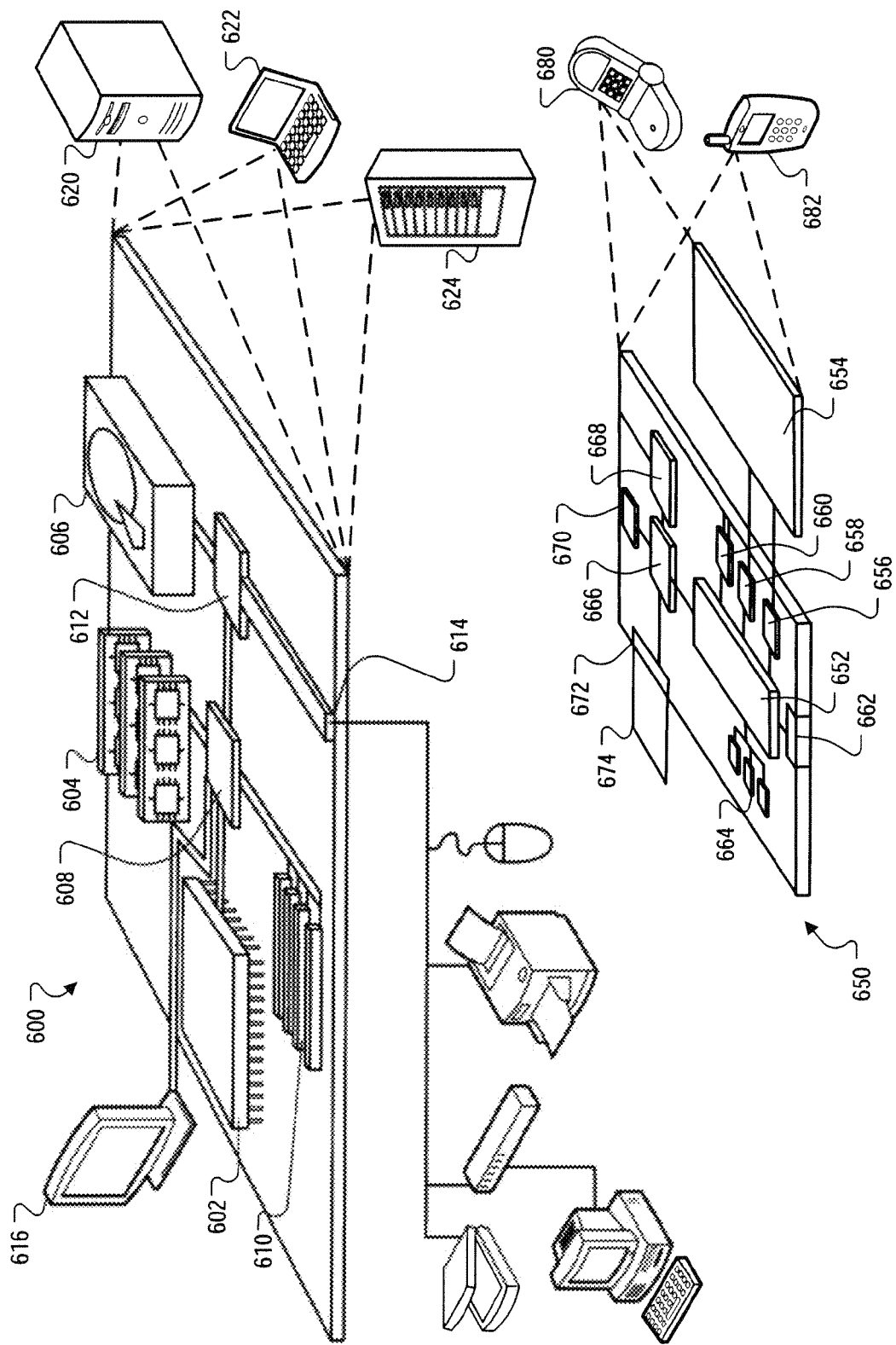
FIG. 6 is a schematic diagram showing an example of a computing device and a mobile computing device that can be used in connection with computer-implemented methods and systems described in this document.

FIG. 6 shows an example of a computing device 600 and a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations described and/or claimed herein.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can be tangibly embodied in a computer or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer or machine-readable medium, such as the memory 664, the expansion memory 674, or memory on the processor 652. In some implementations, the computer program product can be received, for example, over the transceiver 668 or the external interface 662 and stored as a computer or machine-readable medium.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method of theft detection and response for a plurality of stores in a first geographic area, comprising:
   receiving by a computer theft reports containing data concerning thefts at a plurality of stores in a first geographic area or other thefts in the first geographic area;
   providing an investigation center having a computerized theft trend analysis system to analyze the theft reports containing data concerning thefts at a plurality of stores in the first geographic area or other thefts in the first geographic area;
   determining a theft trend for a second geographic area based on the theft reports containing data concerning thefts at the plurality of stores in the first geographic area or other thefts in the first geographic area, the second geographic area is smaller than the first geographic area and within the first geographic area, the second geographic area includes a plurality of stores;
   alerting a plurality of stores within the second geographic area of potential for future thefts;
   automatically initiating a review and analysis, at the investigation center, of video data from each of the stores in only the second geographic area to determine if a person of interest is present at any of the stores in the second geographic area, the person of interest is a person that was involved in a theft forming at least a portion of the theft trend; and,
   sending an alert from the investigation center to a store in the second geographic area notifying the store in the second geographic area that the person of interest is present at the store in the second geographic area.

2. The method as set forth in claim 1, wherein the step of automatically initiating a review and analysis is performed in real time.

3. The method as set forth in claim 1, further comprising the step of sending a notification to other stores in the second geographic area that the person of interest is present at a specific store.

4. The method as set forth in claim 1, wherein the step of receiving theft reports containing data concerning thefts includes receiving stock and inventory reports for items or products previously identified as high theft items.

5. The method as set forth in claim 4, further comprising the step of reviewing video data from an in store monitoring system to determine whether an identifiable individual is responsible for the theft of the products previously identified as high theft items.

6. The method as set forth in claim 5 further comprising the step of reporting to the investigation center a determination that an identifiable individual is responsible for the theft.

7. The method as set forth in claim 6, further comprising the step of analyzing the theft reports for theft patterns.

8. A computer-implemented method of theft detection and response for a plurality of stores in a first geographic area, comprising:
   receiving by a computer theft reports containing data concerning thefts at a plurality of stores in a first geographic area or other thefts in the first geographic area;
   providing a computerized theft trend analysis system to analyze the theft reports containing data concerning thefts at a plurality of stores in the first geographic area or other thefts in the first geographic area;
   determining a theft trend for a second geographic area based on the theft reports containing data concerning thefts at the plurality of stores in the first geographic area or other thefts in the first geographic area, the second geographic area is smaller than the first geographic area and within the first geographic area, the second geographic area includes a plurality of stores;
   notifying each of the plurality of stores within the second geographic area of a person of interest posing a potential future theft threat to the plurality of stores within the second geographic area;
   determining whether the person of interest has been apprehended; and,
   again notifying each of the plurality of stores within the second geographic area of the person of interest posing a potential future theft threat to the plurality of stores within the second geographic area in the event that during the determining step it is determined that the person of interest has not been apprehended.

9. The method as set forth in claim 8, wherein the step of determining a theft trend for the second geographic area includes automatically initiating a review and analysis of video data from each of the stores within the second geographic area in real time.

10. The method as set forth in claim 9, further comprising the step of sending a notification to other stores in the second geographic area that the person of interest is present at a specific store and that the other stores can stop their review and analysis of video data to determine if the person of interest is present.

11. The method as set forth in claim 8, wherein the step of determining a theft trend includes receiving stock and inventory reports for items or products previously identified as high theft items.

12. The method as set forth in claim 11, further comprising the step of reviewing video data from an in store monitoring system to determine whether an identifiable individual is responsible for the theft.

13. The method as set forth in claim 11, further comprising the step of analyzing the theft reports includes analyzing the stock and inventory reports and video data for theft patterns.

14. A computer-implemented method of theft detection and response for a plurality of stores in a first geographic area, comprising:
   identifying and observing, using a computer, theft trends in a first geographic area;
   determining a theft trend for a second geographic area based on the theft trends in the first geographic area, the second geographic area is smaller than the first geographic area and within the first geographic area, the second geographic area includes a plurality of stores;
   notifying each of the plurality of stores within the second geographic area of potential future theft threats to the plurality of stores within the second geographic area;
   monitoring video data from one or more stores in the second geographic area to identify a person of interest, the person of interest is a person that was involved in a theft forming at least a portion the theft trend;
   alerting a store in the second geographic area that the person of interest is present at the store;
   determining whether the person of interest has been apprehended; and,
   again notifying each of the plurality of stores within the second geographic area of the potential future theft threat to the plurality of stores within the second geographic area in the event that during the determining step it is determined that the person of interest has not been apprehended.

15. The method as set forth in claim 14, wherein the step of monitoring video data from one or more stores in the second geographic area is performed in real time.

16. The method as set forth in claim 15, further comprising the step of sending a notification to other stores in the second geographic area that the person of interest is present at a specific store and that the other stores can stop their real time review and analysis of video data to determine if the person of interest is present.

17. The method as set forth in claim 14, wherein the step of receiving theft reports containing data concerning thefts includes receiving stock and inventory reports for items or products previously identified as high theft items.

18. The method as set forth in claim 17, further comprising the step of reviewing video data from an in store monitoring system to determine whether an identifiable individual is responsible for the theft of the products previously identified as high theft items.

19. The method as set forth in claim 17, further comprising the step of analyzing the stock and inventory reports and video data for theft patterns.

20. The method as set forth in claim 14 wherein monitoring video data includes recording video from locations in and around stores that were identified in the theft trend.

* * * * *